US008615578B2

(12) United States Patent
Hu et al.

(10) Patent No.: US 8,615,578 B2
(45) Date of Patent: Dec. 24, 2013

(54) USING A STANDBY DATA STORAGE SYSTEM TO DETECT THE HEALTH OF A CLUSTER OF DATA STORAGE SERVERS

(75) Inventors: Wei Hu, Palo Alto, CA (US); Yunrui Li, Fremont, CA (US); Juan R. Loaiza, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1842 days.

(21) Appl. No.: 11/245,868

(22) Filed: Oct. 7, 2005

(65) Prior Publication Data

US 2007/0083641 A1 Apr. 12, 2007

(51) Int. Cl.
*G06F 15/173* (2006.01)
*G06F 11/00* (2006.01)

(52) U.S. Cl.
USPC .......................... 709/224; 714/4.1; 714/4.11

(58) Field of Classification Search
USPC .................................. 709/224; 714/4.1, 4.11
See application file for complete search history.

(56) References Cited

U.S. PATENT DOCUMENTS

| 5,495,610 | A | 2/1996 | Shing et al. |
|---|---|---|---|
| 5,832,503 | A | 11/1998 | Malik et al. |
| 5,838,918 | A | 11/1998 | Prager et al. |
| 5,968,176 | A | 10/1999 | Nessett et al. |
| 6,047,323 | A | 4/2000 | Krause |
| 6,108,782 | A | 8/2000 | Fletcher et al. |
| 6,167,445 | A | 12/2000 | Gai et al. |
| 6,205,482 | B1 | 3/2001 | Navarre et al. |
| 6,301,613 | B1 | 10/2001 | Ahlstrom et al. |
| 6,341,287 | B1 | 1/2002 | Sziklai et al. |
| 6,353,898 | B1 * | 3/2002 | Wipfel et al. .................. 714/48 |
| 6,490,574 | B1 | 12/2002 | Bennett et al. |
| 6,502,131 | B1 | 12/2002 | Vaid et al. |
| 6,581,093 | B1 | 6/2003 | Verma |
| 6,643,652 | B2 | 11/2003 | Helgeson et al. |
| 6,658,625 | B1 | 12/2003 | Allen |

(Continued)

FOREIGN PATENT DOCUMENTS

| FR | 2801705 A1 | 6/2001 |
|---|---|---|
| JP | 2000-216854 | 8/2000 |
| JP | 2001-84197 | 3/2001 |
| WO | WO 01/75677 A | 10/2001 |

OTHER PUBLICATIONS

Budhiraja, N.; Marzullo, K., "Tradeoffs in implementing primary-backup protocols," Parallel and Distributed Processing, 1995. Proceedings. Seventh IEEE Symposium on , vol., no., pp. 280,288, Oct. 25-28, 1995.*

(Continued)

*Primary Examiner* — Jeffrey R Swearingen
*Assistant Examiner* — Taylor Elfervig
(74) *Attorney, Agent, or Firm* — Hickman Palermo Truong Becker Bingham Wong LLP (57) ABSTRACT

Detecting an operating condition in a multi-server data storage system. One or more of the data storage servers are designated with a status within the cluster. The designating may be performed by at least one of the data storage servers. The status is encoded into log data having records that report changes to the primary data storage performed by the cluster of data storage servers. The log data is transmitted from the primary data storage to the standby data storage system. The standby data storage system determines an operating condition of the cluster of data storage servers based, at least in part, on the status.

30 Claims, 8 Drawing Sheets

(56) References Cited

U.S. PATENT DOCUMENTS

| | | | |
|---|---|---|---|
| 6,728,723 B1 | 4/2004 | Kathail et al. | |
| 6,754,699 B2 | 6/2004 | Swildens et al. | |
| 6,760,761 B1 | 7/2004 | Sciacca | |
| 6,816,903 B1 | 11/2004 | Rakoshitz et al. | |
| 6,892,231 B2 | 5/2005 | Jager | |
| 6,892,235 B1 | 5/2005 | Daude et al. | |
| 6,898,618 B1 | 5/2005 | Slaughter et al. | |
| 6,952,698 B2 * | 10/2005 | Delaire et al. | 707/10 |
| 6,968,389 B1 | 11/2005 | Menditto et al. | |
| 6,981,029 B1 | 12/2005 | Menditto et al. | |
| 7,076,547 B1 | 7/2006 | Black | |
| 7,089,263 B2 | 8/2006 | Arnold et al. | |
| 7,111,194 B1 * | 9/2006 | Schoenthal et al. | 714/7 |
| 7,257,635 B2 | 8/2007 | Chellis et al. | |
| 7,263,699 B2 | 8/2007 | Jacquemot et al. | |
| 7,305,393 B2 | 12/2007 | Seeger et al. | |
| 7,809,691 B1 * | 10/2010 | Karmarkar et al. | 707/674 |
| 2002/0145981 A1 | 10/2002 | Klinker et al. | |
| 2003/0005350 A1 * | 1/2003 | Koning et al. | 714/4 |
| 2003/0023707 A1 | 1/2003 | Ryan | |
| 2003/0065762 A1 | 4/2003 | Stolorz et al. | |
| 2003/0115456 A1 | 6/2003 | Kapoor | |
| 2004/0078644 A1 * | 4/2004 | Fujibayashi et al. | 714/6 |
| 2004/0193658 A1 * | 9/2004 | Kawamura et al. | 707/202 |
| 2006/0040648 A1 | 2/2006 | Vikman et al. | |
| 2006/0085155 A1 | 4/2006 | Miguelanez et al. | |
| 2006/0123016 A1 | 6/2006 | Ashok et al. | |
| 2006/0143608 A1 | 6/2006 | Dostert et al. | |
| 2006/0195816 A1 | 8/2006 | Grandcolas et al. | |
| 2006/0282471 A1 | 12/2006 | Mark et al. | |
| 2010/0325091 A1 * | 12/2010 | Petruzzo | 707/659 |

OTHER PUBLICATIONS

Hagen, C.; Alonso, G., "Highly available process support systems: implementing backup mechanisms," Reliable Distributed Systems, 1999. Proceedings of the 18th IEEE Symposium on , vol., no., pp. 112,121, 1999.*

"Office Action" received in related case U.S. Appl. No. 09/998,095 dated Jan. 29, 2008, 14 pages.

Current Claims in JP for foreign patent application No. 056974/2009 (9 pgs), publication date: Jun. 18, 2009.

* cited by examiner

USING A STANDBY DATA STORAGE SYSTEM TO DETECT THE HEALTH OF A CLUSTER OF DATA STORAGE SERVERS

FIELD OF THE INVENTION

The present invention relates to data availability and integrity, and in particular, maintaining data availability and integrity within a multi-server data storage system.

BACKGROUND OF THE INVENTION

The activities of enterprises are highly intertwined with computers. For many enterprises, computer system unavailability can be disabling. The ability to maintain availability is therefore an important capability of computer systems.

Computer systems used by enterprises store and retrieve large amounts of data. Typically, computer systems rely on data storage systems to perform this function. The data storage system has one or more data storage servers that govern and facilitate access to data storage, processing requests by clients to access the data storage. Data storage servers may also be referred to as data storage instances.

Replication is one technique used to maintain the availability of data storage systems. Replication is the process of replicating data from a "primary" data storage system onto another data storage system, herein referred to as a standby. As changes are made to data on the primary data storage system, the changes are replicated on one or more standby data storage systems. If the primary data storage system becomes unavailable, a standby can be made the primary data storage system.

To help maintain availability and scalability of data storage systems, many customers deploy a data storage cluster. A data storage cluster has a group of one or more data storage servers that provide and manage access to one or more data storages. A data storage cluster is associated with a pool of storage (e.g. a set of disk drives) that is accessible to the data storage servers in the cluster. This might be done over a storage area network (SAN) or over IP as in network-attached storage (NAS). This configuration is useful because the cluster helps to guard against failures of the data storage servers. In certain clusters, all the servers can process requests; this providing increased throughput.

In such a cluster configuration, it is important for the standby data storage system to detect when the primary data storage system has failed so that the standby data storage system can take the appropriate action. The standby data storage system has to rapidly detect data storage server failures on the primary if the standby data storage system is to keep its copy of the data closely in sync with the changes made at the primary data storage system.

Standby data storage systems keep up with changes on the primary data storage system by receiving and applying redo logs (describing the changes) from the primary data storage system and applying them on the copy maintained by the standby data storage system. When the primary data storage system is a cluster, each data storage server maintains and sends its own logs in its own log stream. These log streams are then received by the standby data storage system, merged, and then applied to the standby data storage. The log streams need to be merged because they contain changes to the same set of data blocks and hence must be merged in order for the changes to be applied at the standby in the correct order.

A problem is that if the standby data storage system is unaware of a failure of a data storage server in the primary data storage system, then the standby would still expect to receive and merge log streams from these failed data storage servers. This would cause the standby data storage system to stall and not immediately merge the log streams to apply the logs from the surviving data storage servers. This delay is not acceptable because it prevents the standby data storage system from updating in real-time the changes performed on the primary data storage. Therefore, a need exists for rapidly determining when primary data storage servers are no longer an enabled part of the cluster so that a standby data storage system does not stall waiting for logs from dead data storage servers.

Another problem that can occur is referred to as a split-brain condition in which the data storage servers in a cluster lose connectivity with each other such that the data storage servers reform themselves into two (or more) clusters. Each cluster believes that it has exclusive access to the primary data storage. Since each cluster believes it has exclusive access to the primary data storage, their uncoordinated updates would corrupt the primary data storage. Hardware and software mechanisms may be added to clusters to reduce the possibility of a split-brain condition. However, these mechanisms may fail. Therefore, a need exists to detect as split-brain condition of the primary database system in the event hardware and software mechanisms fail or are not in use.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for detecting an operating condition in a multi-server data storage system is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Architectural Overview

Figure 1:
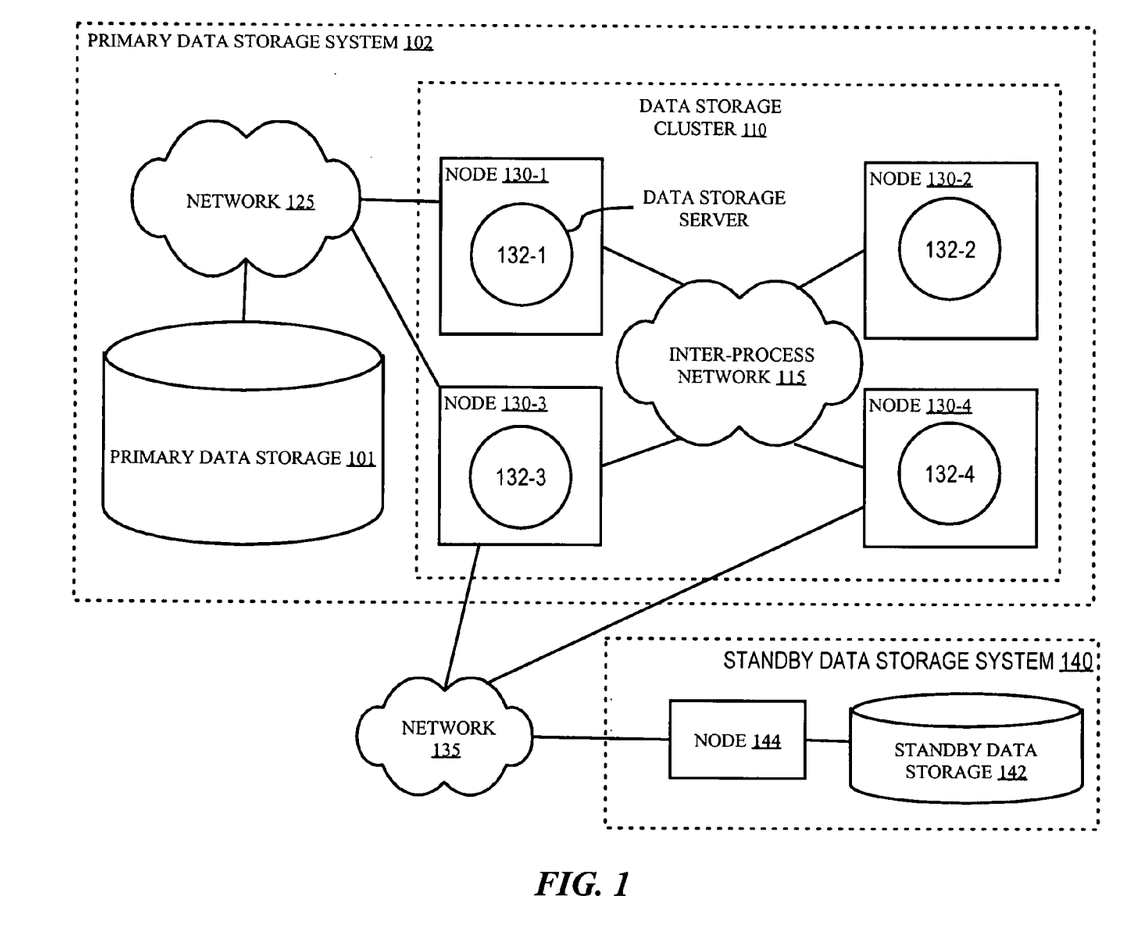
FIG. 1 is a block diagram showing a multi-server data storage system that may be used to implement an embodiment of the present invention.

FIG. 1 shows a distributed computer system that may be used to implement an embodiment of the present invention. Referring to FIG. 1, a primary data storage system 102 having a primary data storage 101 and a data storage cluster 110 is coupled to a standby data storage system 140 via network 135. The data storage may be a storage array, a database, file systems, disk sectors, or any other way of storing data. Moreover, there may be more than one data storage 101.

The data storage cluster 110 comprises multiple data storage servers or instances 132-1, 132-2, 132-3, and 132-4 running on a group of interconnected nodes 130-1, 130-2, 130-3, and 130-4. All of the nodes 130 in the cluster 110 can access the networks 135 and 125, although to not obscure the drawing only nodes 130-3 and 130-4 are shown connected to networks 135 and 125. In an embodiment, in which there are more than one primary data storage 101, the data storage servers 132 may access different primary data storages 101 from each other.

In general, a data storage server governs and facilitates access to particular data storage, processing requests by clients to access the data storage. A multi-node data storage server comprises multiple data storage servers (also referred to as data storage instances). A server, such as a data storage server 132-1, is a combination of integrated software components and an allocation of computational resources, such as memory, a node, and processes on the node for executing the integrated software components on a processor. The combination of the software and computational resources is dedicated to performing a particular function on behalf of one or more clients. Resources from multiple nodes in a distributed computer system can be allocated to running a particular server's software. A particular combination of the software on a node and the allocation of the resources from the node is referred to herein as a data storage server or instance. Thus, a distributed data storage system comprises multiple data storage servers that can run on multiple nodes. Several data storage servers can even run on the same node. Data storage servers 132-1, 132-2, 132-3, and 132-4 thus comprise a multi-node data storage system. In another example, the data storage servers on a multi-node data storage server may access separate data storages.

The nodes 130 on the data storage cluster 110 access the primary data storage 101 via network 125. To not obscure the drawing, the connections from nodes 130-2 and 130-3 to the network are not depicted in FIG. 1. The nodes 130 communicate with each other via the inter-process network 115. The nodes 130 in a cluster 110 may be in the form of computers (e.g. work stations, personal computers) interconnected via a network. Alternately, the nodes 110 may be server blades interconnected with other server blades on a rack.

The standby data storage system 140 comprises a standby data storage 142 and node 144 that comprises at least one processor and a computer readable medium. One or more data storage serves may execute on the node. The standby data storage system 140 provides a back up for the primary data storage system 101. The standby data storage system 140 may comprise a data storage server cluster; however, this is not required. There may be any number of standby data storage systems that replicate the data on the primary data storage 101.

Changes made on the primary data storage 101 are replicated on standby data storage 142. Thus, the standby data storage 142 is kept synchronized with the primary data storage 101 by shipping a description of changes to the primary data storage over the network 135. However, the network 135 is not required. The primary data storage system 102 may generate and store a change log describing changes made to the primary data storage 101. The change log can describe the changes logically (i.e., the record(s) (e.g., row(s)) affected by an operation) or physically (i.e., which blocks were changed), or both. The change log may reside anywhere on primary data storage system 102. The change log may be used to recover from a failure by, for example, re-executing operations described in the change log, bringing the data storage system to its pre-failure state.

In one embodiment, the change log describes changes made to a specified block. For example, storage arrays keep track of changes on a per-block, per-track basis and send this information in the change log. In another embodiment, the change log describes changes made to specified bytes. For example, the change log specifies a range of bytes to be changed. In still another embodiment, the change log describes transactions that were performed on the primary data storage. For example, in an embodiment in which the data storage is a database and the data storage cluster is a database cluster having multiple database servers, the change log includes redo records that describe the changes to the database and the order in which the changes were made. Examples of information stored in the redo records include the identity of the transactions in which operations are performed, the time in which the transactions were committed, and the particular operations performed in each of the transactions, e.g. updates, deletes, and inserts of rows.

At least some of the information in the change log is sent to the standby data storage system 140 to keep the standby data storage 142 synchronized with the primary data storage 101. In one embodiment, a separate log stream for each data storage server 132 is sent to the standby data storage system 140. The standby data storage system 140 merges the log streams, based on the time at which the transactions were committed. The standby data storage system determines one or more operating conditions of the primary data storage system from status information sent in the log streams. The status information describes whether data storage servers 132 are enabled members of the cluster, in one embodiment.

Each data storage server 132 is able to determine what other data storage servers 132 are, from its own perspective, enabled members of the data storage cluster 110. This determination may be made based on many techniques, including signals sent on the inter-process network 115. For example, if data storage server 132-1 does not receive a signal over inter-process network 115 from data storage server 132-2, then data storage server 132-1 determines that data storage server 132-2 is not an enabled member of the data storage cluster 110. The reason for data storage server 132-2 being disabled, from the perspective of data storage server 132-1, may be that node 130-2 is shut down or that the data storage server 132-2 is shut down. However, if the inter-process network 115 fails it may appear to data storage server 132-1 that other data storage servers are disabled, when in fact they are operational and able to access the primary data storage 101.

The primary data storage servers 132 report status to the standby data storage system 140 and store the reported status information. In one embodiment, the data storage servers 132 have access to a status table (not depicted in FIG. 1) residing, for example, in the primary data storage system 102 that reflects the data storage server status reported to the standby data storage system 140 by the primary data storage system 102.

Functional Overview

An embodiment in accordance with the present invention is a method of using a standby data storage system to detect an operating condition of a cluster of data storage servers that control changes to a primary data storage. In accordance with this embodiment, one or more of the data storage servers are designated with a status that describes a membership role in the cluster. The status is encoded into log data that report changes to the primary data storage performed by the cluster of data storage servers. The log data is transmitted from the primary data storage to the standby data storage system. The standby data storage system determines an operating condition of the cluster of data storage servers based, at least in part, on the status.

In one embodiment, when a data storage server within the primary cluster shuts down or crashes, the other data storage servers in the cluster communicates this information to the standby data storage system by sending a disable indication in the log stream. The disable indication identifies a particular data storage server has shut down. In one embodiment of the invention, the sending of the disable indication is initiated by some enabled server in the primary cluster, and in another embodiment, it is initiated by a process independent of the primary cluster that checks the status of the primary cluster.

In one embodiment of the invention, the standby data storage system does not wait for a log stream from a data storage server that is designated as disabled. Thus, the standby is able to merge the log streams from the other data storage servers without stalling.

The disable indications may be sent in-band. In other words, the format of the disable records conform to the format typically used to send log streams from the primary data storage system to the standby data storage system. Since the indications are sent in-band, there is no need to look in alternate locations or files; this simplifies the processing on the standby data storage system. Furthermore, by sending the status in the log stream, the standby data storage system may use time information in the log stream to precisely identify when an operating condition pertaining to the status occurred.

In one embodiment of the invention, when a data storage server within the cluster starts up, the cluster communicates this information to the standby by sending an enable indication in a log stream. The enable indication contains data that indicates a particular data storage server has started up. In one embodiment of the invention, the sending of the enable indication is initiated by the cluster, and in another embodiment, it is initiated by a process independent of the cluster.

Like disable indication, the enable indication may be sent in-band.

The standby data storage system detects a split-brain condition, in one embodiment. A split brain is a condition in which the data storage servers in a cluster improperly operate as multiple clusters. This may occur due to a loss of communication between some or all of the data storage servers within the primary cluster. For example, if the inter-process network (FIG. 1, 115) fails, one or more data storage servers will lose communication with at least one other data storage server.

In one embodiment of the invention, a split brain is inferred when the standby data storage system receives a log indicating a change made to the primary data storage by a data storage server that is currently designated as disabled. For example, the standby receives a disable indication designating a data storage server as not being an enabled member of the cluster. During a period in which the data storage server is designated as disabled, the standby data storage system receives a log associated with the disabled data storage server that describes a transaction that changes the primary data storage. The standby data storage system infers that a split-brain condition has occurred from this unexpected log. The standby stops processing data storage updates from logs from any data storage server, thus preventing any data corruption.

In accordance with another embodiment, a split-brain condition is detected if the standby data storage system receives inconsistent cluster membership records. In this embodiment, the enabled data storage servers encode cluster membership information into their respective logs and transfer this information to the standby data storage system. For example, each enabled data storage server determines what data storage servers it believes are enabled members of the cluster. If the standby data storage system determines that the cluster membership information is inconsistent, a split-brain condition is inferred.

Figure 2:
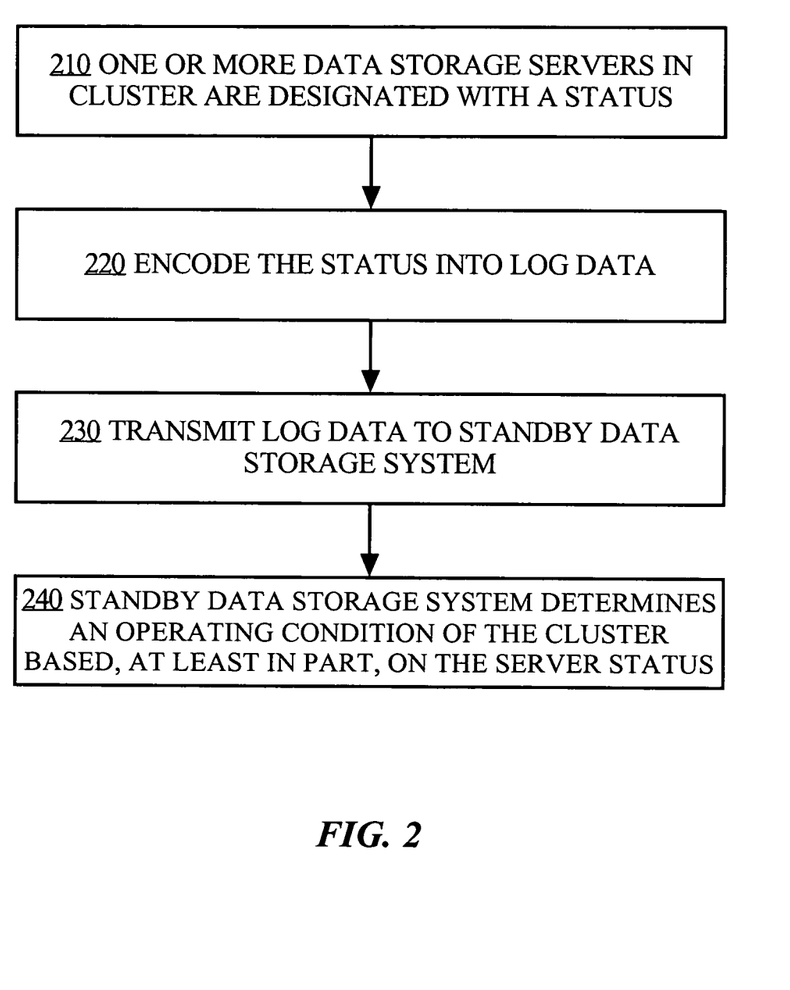
FIG. 2 is a flowchart illustrating steps of a process of a standby data storage system detecting an operating condition of a cluster of data storage servers that control changes to a primary data storage, in accordance with an embodiment.

Standby Data Storage System Detecting an Operating Condition of a Data Storage Cluster FIG. 2 is a flowchart illustrating steps of a process of a standby data storage system detecting an operating condition of a cluster of data storage servers that control changes to a primary data storage, in accordance with an embodiment. The standby data storage system and enabled data storage servers should be able to determine a stored status of each data storage server. For example, the standby data storage system may store a status that is reported to it by the data storage servers, and the data storage servers may have access to a status table residing, for example, in the primary data storage system. The status table in the primary data storage system reflects the status reported to the standby data storage system.

In block 210, one or more of the data storage servers in the cluster are designated with a current status. The status describes a membership role of the one or more of the data storage servers in the cluster. For example, the status may be that a designated data storage server is considered by the designator to be an enabled or a disabled member of the cluster. The status may also describe a set of all data storage servers that are considered by the designator to be enabled members of the cluster. The status may be designated by at least one of the other data storage servers. However, the status may be designated by a process other than one of the data storage servers.

In one embodiment, block 210 comprises one of the data storage servers designating another of the data storage servers as a disabled member of the cluster. This designation may be responsive to determining that a data storage server that was designated as enabled has recently become disabled. For example, a data storage server might determine that another server is not responding or making progress. This means that the information stored in a status table does not agree with a currently determined status. In one embodiment, block 210 comprises one of the data storage servers designating another of the data storage servers as an enabled member of the cluster. This designation may be responsive to determining that a data storage server that is designated in a table as disabled is currently determined to be an enabled cluster member.

In one embodiment, block 210 comprises at least two of the data storage servers designating respective sets of data storage servers as enabled members in the cluster. For example, each enabled data storage server determines what it understands to be the set of enabled data storage servers in the cluster. This understanding may be based on communications received, or expected to be received, on the inter-process network (FIG. 1, 115). In one embodiment, the data storage servers designate the sets of data storage servers responsive to determining a change of cluster membership. In another embodiment, the designating is initiated at any convenient time, such as at periodic intervals.

In block 220, the status is encoded into log data that report changes to the primary data storage performed by the cluster of data storage servers. The status may be encoded as a separate record in the log data, as a header in a record that contains an update to the primary data storage, etc. In one embodiment, there is a separate log associated with each data storage server; each log would contain the status of the associated data storage server. In one embodiment, block 220 includes encoding, into the log data, time information associated with designating the status to the data storage server. In one embodiment, the time information comprises a start time and an end time associated with a log. However, the time information is not limited to comprising a start time and an end time associated with a log. For example, the time information could also be a single point in time. The time information may be based on the time at which the status of the data storage server changed, the time the change was detected, the time of the last data storage transaction involving the data storage server, etc. The time information is based on range of time for which the status applies, in one embodiment. For example, a data storage server may designate a set of enabled members in the cluster and a start time and an end time for which the cluster membership applies. In one embodiment, the period is open-ended.

In block 230, the log data is transmitted from the primary data storage system to the standby data storage system. Thus, the status information is transferred in-band as part of a normal process of providing log data to the standby data storage system.

In block 240, the standby data storage system determines an operating condition of the cluster of data storage servers based, at least in part, on the status. The operating condition may comprise a particular data storage server being a disabled member of the cluster. Knowing this operating condition allows the standby data storage to continue processing log streams from the other data storage servers, without waiting for further logs from the disabled data storage server. The operating condition may also comprise the cluster operating as multiple clusters. For example, loss of communication between data storage servers may cause the cluster to effectively divide into two clusters each believing it has the right to control changes to the primary data storage without regard to the other cluster. This condition may be referred to as a split-brain condition.

Block 240 may be based on the status information alone or on the status information with other information in the log data. In one embodiment, the determination in block 240 is based on the status information and log data that reports changes to the primary data storage performed by the cluster of data storage servers. The standby data storage system infers a split-brain condition upon detecting an unexpected log, in one embodiment. For example, if the standby data storage system receives, in the log data, an indication of a change to the primary data storage made by a data storage server at a period in which that data storage server is designated as a disabled member of the cluster, a split-brain condition may be inferred.

Disabling a Log Stream

Figure 3A:
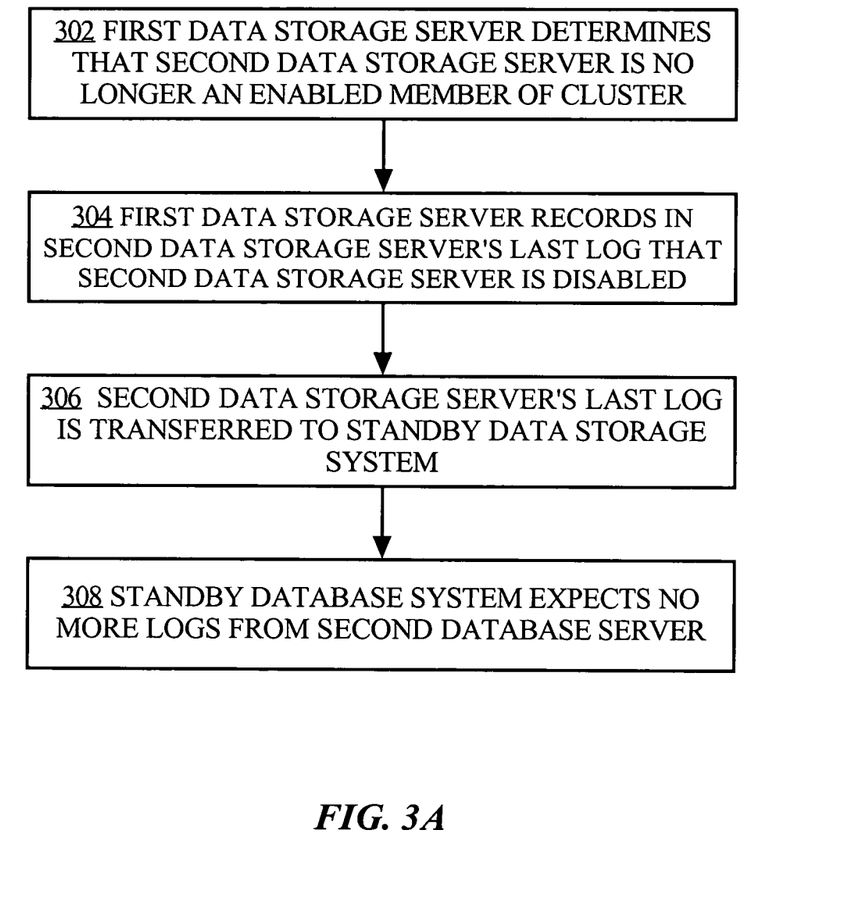
FIG. 3A is a flowchart illustrating a process of disabling a log stream of a data storage server that is no longer an enabled member in a cluster in a primary data storage system, in accordance with an embodiment of the present invention.

FIG. 3A is a flowchart illustrating a process of disabling a log stream, in accordance with an embodiment of the present invention. This embodiment may be used to notify a standby data storage system that a data storage server is no longer an enabled member in a cluster in a primary data storage system. This allows the standby data storage system to continue merging the data streams for the other data storage serves, without waiting for logs from the disabled data storage server.

In block 302, a first data storage server determines that second data storage server is no longer an enabled member of the cluster. The reason that the data storage server became disabled may be due to a fault or to a part of normal shutdown. The data storage servers in the cluster may inform each other that they are enabled on a periodic basis. The first data storage server may determine that the second data storage server (disabled data storage server) is no longer an enabled member based on a failure to receive this communication.

In block 304, the first data storage server records an indication that the disabled data storage server is no longer enabled in the disabled data storage server's last log. For example, when a data storage server becomes disabled the data storage server's last log may remain open, in which case the last log may be patched and an indication placed in the last log that the data storage server is disabled. In one embodiment, the indication is provided by placing a disabled flag in a header field of a record in the disabled data storage server's last log. The first server may also place time information in the disabled data storage server's last log. The last log may already have a start time that was entered prior to the data storage server becoming disabled. In one embodiment, the first data storage server adds an end time to the disabled data storage server's last log. The patching of the log is possible because the data storage servers can access the logs of the disabled server since they are part of the data storage (FIG. 1. 101) that is accessible to the entire cluster.

In another embodiment, when a first data storage server in the cluster is shut down normally, as part of the processing for normal shutdown, if it determines that a second enabled member of the cluster is running, the first data storage server places an indication that it has become disabled in its own last log, instead of relying on the second data storage server to put the indication in the first storage server's log after the first storage server has is disabled.

In another embodiment, the disable indication is placed elsewhere than in the disabled data storage server's last log. For example, the log stream of the disabled data storage server may be continued by creating a dummy log and sending it to the standby data storage server. The dummy log can be used to notify the standby data storage server of the disabled data storage server.

In block 306, the disabled data storage server's last log with the disabled indicator is transferred to the standby data storage system. Alternatively, a dummy log is sent in the data stream of the disabled data storage server.

In block 308, the standby data storage system determines that it should not expect to receive any more logs from the disabled data storage server. Thus, the standby data storage system does not stall waiting for the possibility that the disabled data storage server will send another log. The standby data storage system is thus able to merge log streams from the enabled data storage servers without waiting for a log from the disabled data storage server.

When the only remaining enabled data storage server becomes disabled, there will not be another data storage server to mark it as disabled. Therefore, this last enabled data storage server will have its status remain as enabled, in one embodiment.

Re-enabling a Log Stream

Figure 3B:
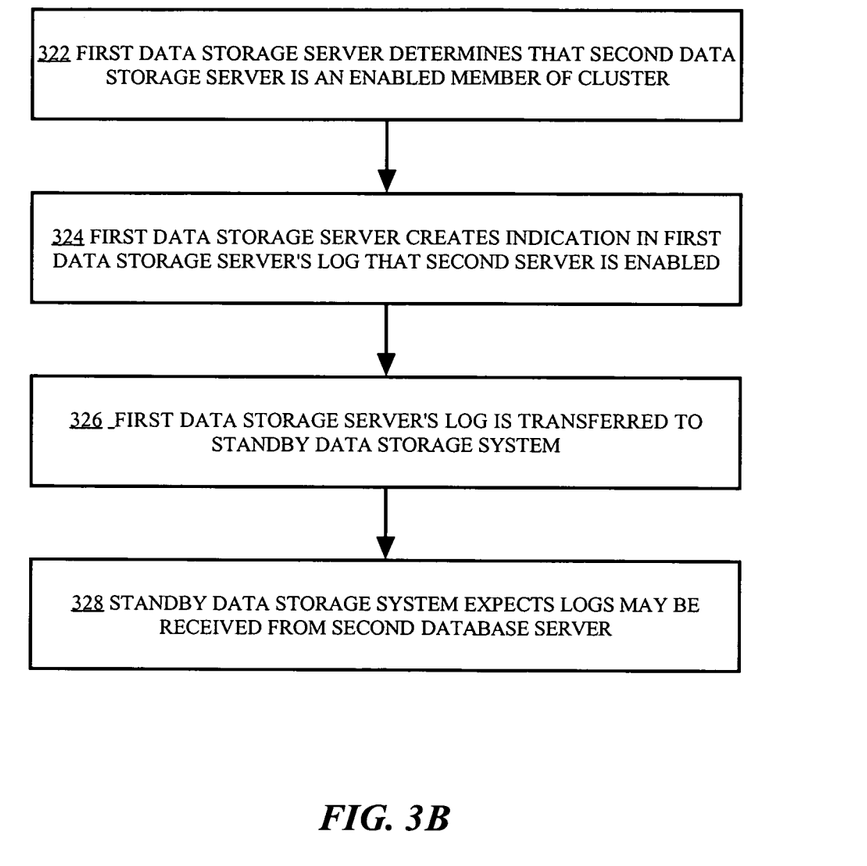
FIG. 3B is a flowchart illustrating a process of re-enabling a log stream of a data storage server that is a re-enabled member in a cluster in a primary data storage system, in accordance with an embodiment of the present invention.

FIG. 3B is a flowchart illustrating a process of internally re-enabling a log stream, in accordance with an embodiment of the present invention. This embodiment may be used to notify a standby data storage system that a data storage server is a re-enabled member in a cluster in a primary data storage. A data storage server is re-enabled if it is restarted after being shutdown or crashed. In block 322, a first data storage server determines that second data storage server is a re-enabled member of the cluster. The data storage servers in the cluster may inform each other that they are enabled on a periodic basis. The first data storage server may determine that the second data storage server (re-enabled data storage server) has become an enabled member based on receiving this communication.

In block 324, the first data storage server records an indication that the enabled data storage server is enabled in the first data storage server's log. The indication is not recorded in the re-enabled data storage server's log because the standby data storage system does not expect to receive logs from a data storage server that is not enabled. In one embodiment, the indication is provided by creating a record in the first data storage server's log. The first data storage server's log also has time information related to when the re-enabled data storage server was designated as enabled. This time information may be used by the standby data storage system to determine how to merge the data streams from the various data storage servers. The time information may comprise a start and an end time for the log, although a single point in time may be specified.

In block 326, first data storage server's log is transferred to the standby data storage system. For example, a record with an indication of the re-enabled data storage server is transferred to the standby data storage system in the first data storage server's log stream.

In block 328, the standby data storage system determines that it may expect to receive logs in the log stream of the re-enabled data storage server. The re-enabled data storage server is now free to send to the standby data storage system logs with its changes.

Re-enabling Log Stream from Perspective of Re-enabled Data Storage Server

Figure 3C:
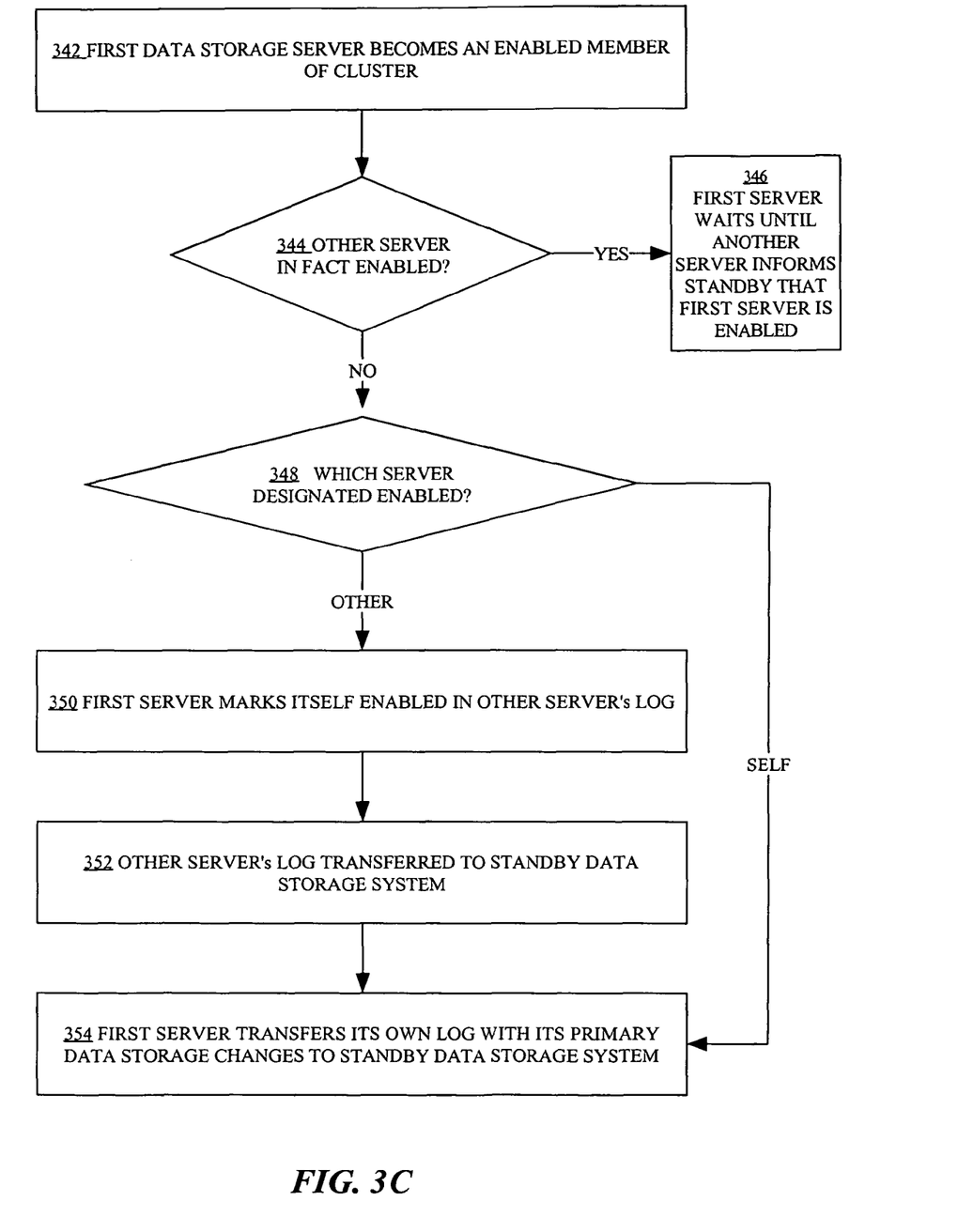
FIG. 3C is a flowchart illustrating a process describing steps taken by a re-enabled data storage server, in accordance with an embodiment of the present invention.

FIG. 3C is a flowchart illustrating a process describing re-enabling a log stream from the perspective of a re-enabled data storage server, in accordance with an embodiment of the present invention. This process may be used to inform a standby data storage system of the re-enabled data storage server. In block 342, a first data storage server becomes an enabled member of the cluster.

In block 344, the re-enabled data storage server determines if, from the perspective of the re-enabled data storage server, there are any other data storage servers that are currently enabled in the cluster ("in fact enabled data storage server"). If there is at least one other data storage server that is in fact enabled, then the re-enabled data storage server waits until the in fact enabled data storage server informs the standby data storage system that the re-enabled data storage server has become a cluster member. The re-enabled data storage server waits until the standby data storage server is aware it is enabled because the standby data storage system does not expect to receive a log from a data storage server that was designated as disabled, in one embodiment. The re-enabled data storage server waits until blocks 322-326 of FIG. 3B are performed, in one embodiment.

If the re-enabled data storage server determines, in block 344, that there are currently no other in fact enabled data storage servers in the cluster, then the re-enabled data storage server determines what data storage server is reported to the standby data storage system as enabled, in block 348. The data storage server that is reported as enabled may be another data storage server or the data storage server that is re-enabled. The data storage servers have access to a table that defines the status of each data storage server as reported to the standby data storage server, in one embodiment. There should be at least one data storage server reported as enabled, even though it is in fact disabled because when the last data storage server become disabled there is no other data storage server to report it as disabled to the standby data storage system. Therefore, this last in fact disabled data storage server will have its status remain as enabled, in one embodiment. The standby data storage system also stores the status, and will have this data storage server designated as enabled in a status table even though it is in fact disabled.

If the newly enabled data storage server determines that it is the data storage server that is designated in the status table as enabled, then it is free to send its own logs to the standby data storage system, in block 354. In other words, if the newly enabled data storage server determines that it is already reported as enabled to the standby data storage server, then it is free to send its own logs to the standby data storage system, in block 354.

If the newly enabled data storage server determines that another data storage server is currently designated as enabled, then it proceeds to block 350, in which the re-enabled data storage server records that it is enabled in the log stream of the data storage server that is currently reported to the standby data storage system as enabled. The indication is generally not recorded in the re-enabled data storage server's log stream because the standby data storage system does not expect to receive logs in the log stream of a data storage server that is designated as disabled. The log may also have time information indicating either a point in time or range in time in which the re-enabled data storage server was designated as enabled.

In block 352, the log of the in fact disabled (although designated as enabled) data storage server, which now has the enable indicator of the re-enabled data storage server, is transferred to the standby data storage system.

In block 354, the re-enabled data storage server transfers its own log with changes that it made to the primary data storage after the standby data storage system was informed that it was re-enabled. Moreover, after the standby data storage system has been notified about the re-enabled data storage server, the status of the data storage server that is in fact disabled may be changed from enabled to disabled by sending information in the log stream of either the newly enabled data storage server or the data storage server that is fact disabled. For example, the embodiment described in FIG. 3A may be used.

Detecting a Split Brain, First Embodiment

Figure 4A:
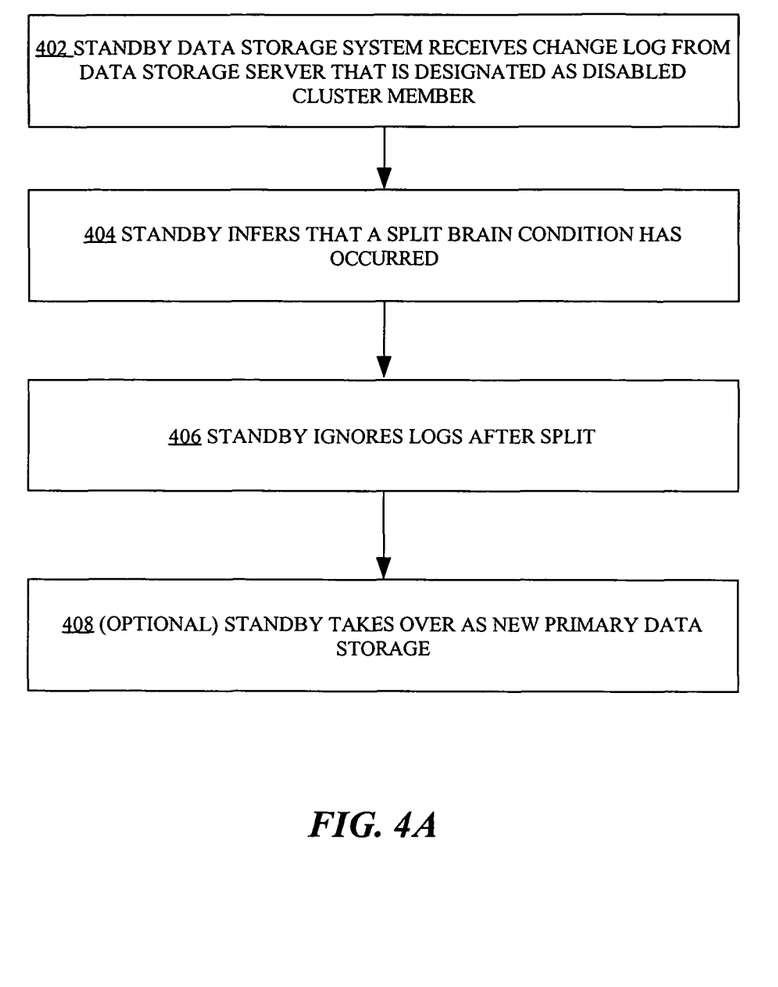
FIG. 4A is a flowchart illustrating a process of a standby data storage system detecting a split brain condition of a primary data storage system, in accordance with an embodiment of the present invention.

FIG. 4A is a flowchart illustrating a process of a standby data storage system detecting a split brain condition of a primary data storage system, in accordance with an embodiment of the present invention. As used herein, a split-brain condition refers to a condition in which members of a cluster do not agree upon which data storage servers are enabled members in the cluster. In block 402, the standby data storage receives a log in a log stream of a data storage server that is designated as a disabled member of the cluster.

In block 404, the standby data storage system infers that split-brain condition has occurred in the cluster. The standby data storage may make this inference because a data storage server that is designated as a disabled member of the cluster should not send logs that indicate changes to the primary data storage. In one embodiment, after a data storage server has gone down, its log stream is continued by sending empty logs to the standby data storage. In this case, the empty logs do not indicate a change to the primary data storage. Therefore, the standby data storage system does not infer a split-brain condition upon receiving an empty log in a log steam from a data storage server designated as a disabled member of the cluster.

Thus, in this embodiment, the standby data storage system infers the split brain based on status information that was encoded into the log stream, as well as with data that the data storage servers in the cluster would normally transfer as part of the process of informing the standby data storage system of updates made to the primary data storage.

In block 406, the standby data storage system ignores any further logs received by the data storage servers in the cluster. In optional block 408, the standby data storage system takes over as the primary data storage system.

Detecting a Split Brain, Second Embodiment

Figure 4B:
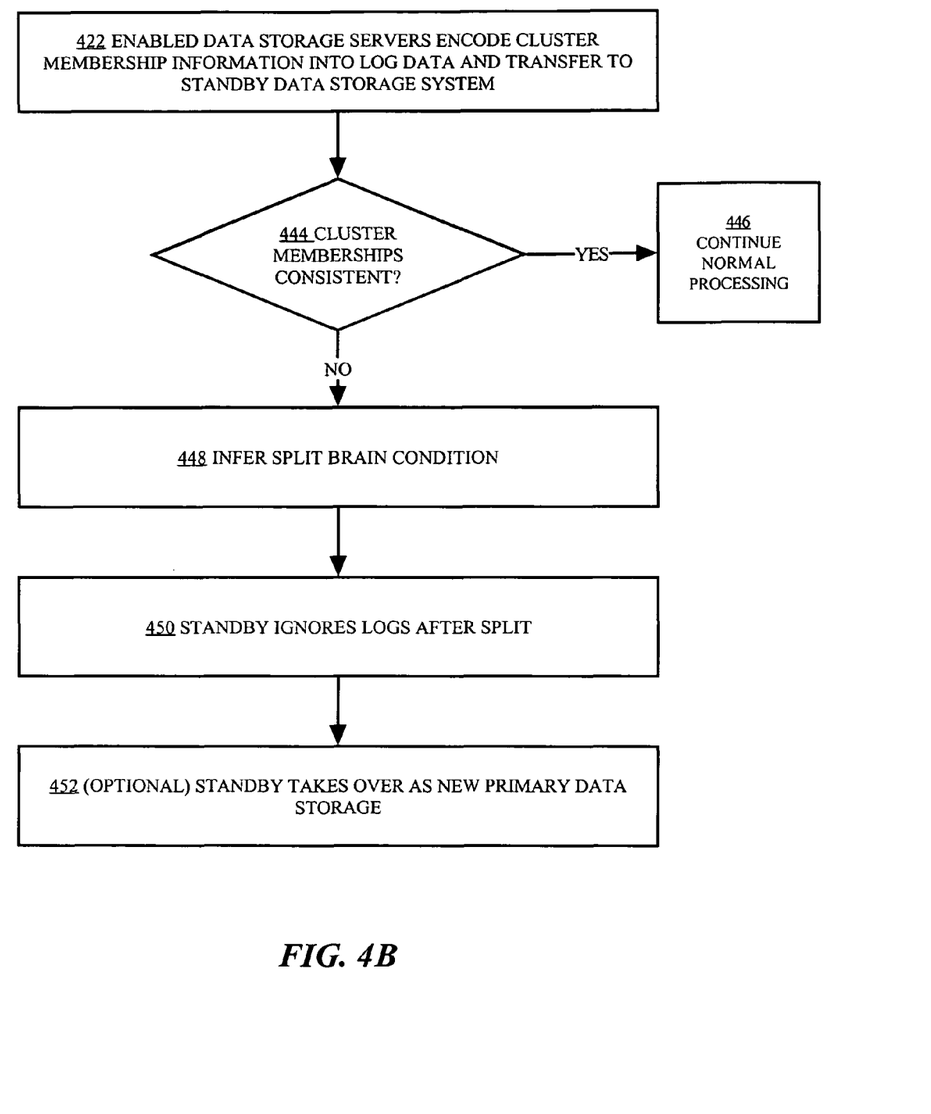
FIG. 4B is a flowchart illustrating a process of a standby data storage system detecting a split brain condition of a primary data storage-system, in accordance with another embodiment of the present invention.

FIG. 4B is a flowchart illustrating a process of a standby data storages system detecting a split brain condition of a primary data storage system, in accordance with another embodiment of the present invention. In block 422, the enabled data storage servers in the cluster encode cluster membership information into logs and transfer this information to the standby data storage system. For example, each enabled data storage server determines what data storage servers it believes are enabled members of the cluster. Each data storage server sends a record in its own log stream, in one embodiment. In one embodiment, the cluster membership information is sent when a data storage server detects a change that affects cluster membership. However, the cluster membership information may be sent at any time. In another embodiment, enabled data storage servers send the set of enabled cluster members at a periodic interval.

In block 444, the standby data storage system analyzes the status information sent in block 422. Thus, the standby data storage system determines if each data storage server understands the cluster membership to be the same. The analysis may be based on time information in the logs. For example, the logs may contain a period defined by a start time and an end time of time for which the cluster membership applies. The standby data storage system determines if the cluster memberships are the same for periods that overlap, in one embodiment.

If the standby data storage system determines that the reported cluster memberships are the same, then the standby-data storage system continues with normal processing, in block 446.

If the standby data storage system determines that there is difference between the reported cluster memberships, then the standby data storage system infers a split-brain condition, in block 448.

In block 450, the standby data storage ignores any further logs received by the data storage servers in the cluster. In optional block 452, the standby data storage system takes over as the primary data storage system.

Preventing Corruption of Primary Data Storage

In accordance with an embodiment, the standby data storage system prevents the primary data storage system from corrupting its copy of the data storage by having the primary data storage system synchronize with the standby data storage system whenever the primary data storage system's view of enabled data storage servers changes. If the standby data storage system determines that there has been a split brain, it returns an indication for the primary data storage system to halt any changes to the primary data storage. This synchronization should be done before the primary data storage system writes to the primary data storage after a cluster transition.

Alternatively, for an implementation that first writes to the standby data storage before updating the primary data storage, the standby data storage system can also return a failure indication (for the write to the standby copy) to prevent the write on the primary data storage.

Hardware Overview

Figure 5:
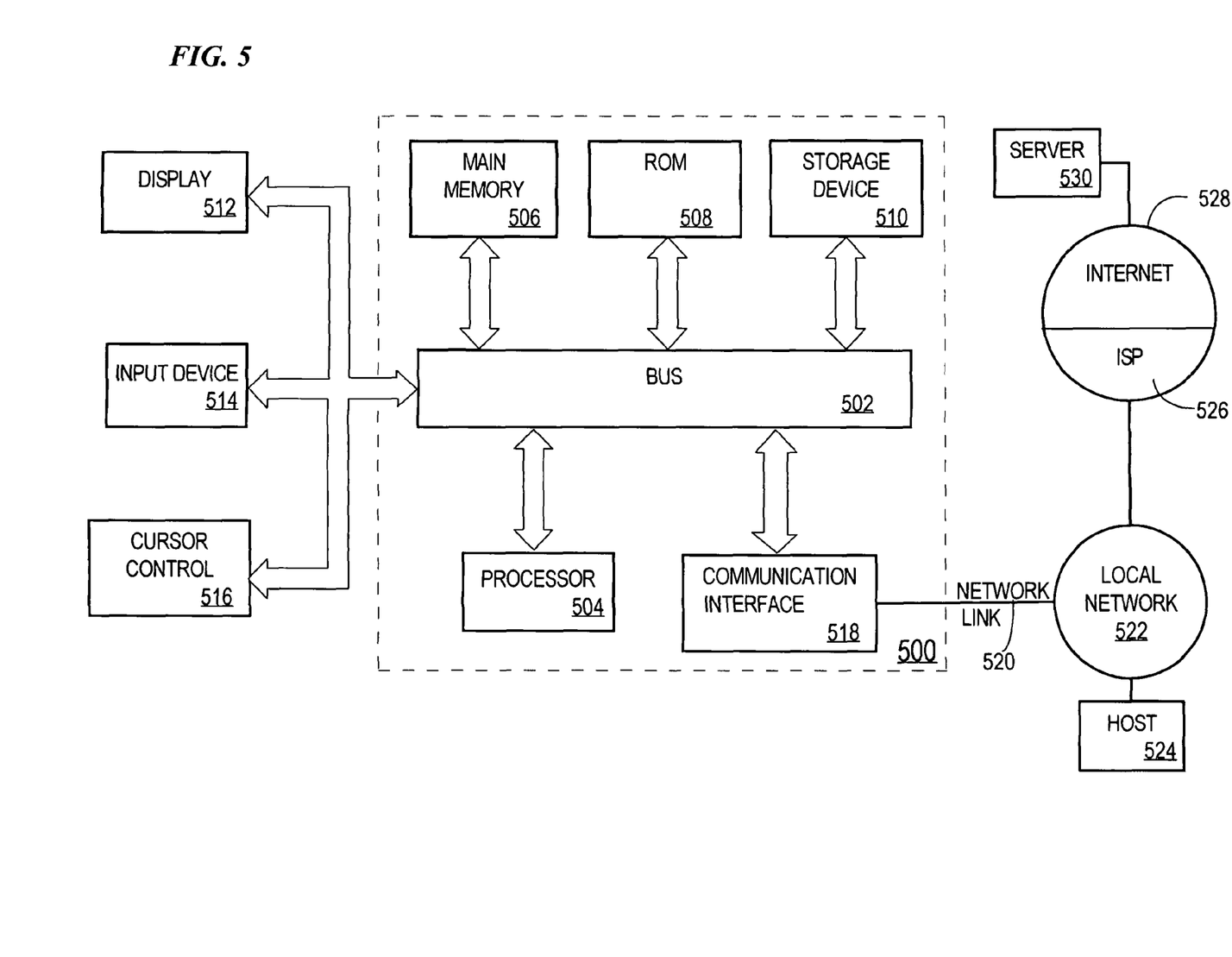
FIG. 5 is a block diagram that illustrates a computer system upon which an embodiment may be implemented.

FIG. 5 is a block diagram that illustrates a general-purpose computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 505. Main memory 506 also may be used for storing temporary variables or other intermediate information during execution of instructions to be executed by processor 505. Computer system 500 further includes a read only memory ("ROM") 508 or other static storage device coupled to bus 502 for storing static information and instructions for processor 505. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 515, including alphanumeric and other keys, is coupled to bus 502 for communicating information and command selections to processor 505. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for re-authenticating computing devices. According to one embodiment of the invention, re-authenticating computing devices is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 505.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for re-authenticating computing devices as described herein.

The received code may be executed by processor 504 as it is received, and/or stored in storage device 510, or other non-volatile storage for later execution. In this manner, computer system 500 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of using a standby data storage system to detect a condition of a cluster of data storage servers that control changes to a primary data storage, said method comprising computer-implemented steps of:
    transmitting a stream of data comprising log data from a change log to said standby data storage system, wherein the log data specifies changes made to data stored at said primary data storage, wherein said stream of data comprising log data is used by said standby data storage system to replicate said changes made to data stored at said primary data storage to data stored at said standby data storage system;
    determining an operating status for one or more of said data storage servers within said cluster;
    causing a message reporting said operating status to be transmitted inband within said stream itself to said standby data storage system; and
    determining, at said standby data storage system, an operating condition of said cluster of data storage servers based, at least in part, on said message reporting said operating status;
    wherein the method is performed by one or more computing devices.

2. A method as recited in claim 1, wherein said operating condition comprises a particular data storage server being a disabled member of said cluster.

3. A method as recited in claim 1, wherein said operating condition comprises a particular data storage server being an enabled member of said cluster.

4. A method as recited in claim 1, wherein said operating condition comprises said cluster operating as multiple clusters.

5. A method as recited in claim 4, wherein said determining said operating condition is further based on said changes.

6. A method as recited in claim 5, wherein said determining said operating condition comprises receiving, in said log data, an indication of a change to said primary data storage made by a first data storage server at a period in which said first data storage server is designated with an operating status of a disabled member of said cluster.

7. A method as recited in claim 4, further comprising:
    said standby data storage system determining a time at which said cluster was determined to be operating as multiple clusters, based on information transmitted inband within said log data; and
    said standby data storage system ignoring changes to said primary data storage reported as having occurred after said time at which said cluster was determined to be operating as multiple clusters.

8. A method as recited in claim 4, further comprising:
said standby data storage system replacing said primary data storage as a new primary data storage.

9. A method as recited in claim 4, wherein:
said determining said operating status for one or more of said data storage servers within said cluster comprises each enabled data storage server designating a set of enabled members in said cluster; and
said determining said operating condition comprises detecting an inconsistency among the designated sets of enabled members in said cluster.

10. A method as recited in claim 1, wherein said determining said operating status comprises a first of said data storage servers designating a second of said data storage servers as a disabled member of said cluster.

11. A method as recited in claim 10, wherein said determining said operating status further comprises encoding a time at which said second data of said storage server is designated as a disabled member of said cluster.

12. A method as recited in claim 1, wherein said determining said operating status comprises at least two of said data storage servers designating respective sets of data storage servers as enabled members in said cluster.

13. A method as recited in claim 1, wherein said primary data storage comprises a database.

14. A method as recited in claim 1, wherein said primary data storage comprises a file system.

15. A method as recited in claim 1, wherein said primary data storage comprises a storage array.

16. A non-transitory computer readable medium carrying one of more sequences of instructions, wherein execution of the one or more sequences of instructions by one or more processors causes the one or more processors to perform a method of using a standby data storage system to detect an operating condition of a cluster of data storage servers that control changes to a primary data storage, said method comprising the steps of:
transmitting a stream of data comprising log data from a change log to said standby data storage system, wherein the log data specifies changes made to data stored at said primary data storage, wherein said stream of data comprising log data is used by said standby data storage system to by replicate said changes made to data stored at said primary data storage to data stored at said standby data storage system;
determining an operating status for one or more of said data storage servers within said cluster;
causing a message reporting said operating status to be transmitted inband within said stream itself to said standby data storage system; and
determining, at said standby data storage system, an operating condition of said cluster of data storage servers based, at least in part, on said message reporting said operating status.

17. A computer readable medium as recited in claim 16, wherein said operating condition comprises a particular data storage server being a disabled member of said cluster.

18. A computer readable medium as recited in claim 16, wherein said operating condition comprises a particular data storage server being a disabled member of said cluster.

19. A computer readable medium as recited in claim 16, wherein said operating condition comprises said cluster operating as multiple clusters.

20. A computer readable medium as recited in claim 19, wherein said step of determining said operating condition in said method is further based on said changes.

21. A computer readable medium as recited in claim 20, wherein said step of determining said operating condition comprises receiving, in said log data, an indication of a change to said primary data storage made by a first data storage server at a period in which said first data storage server is designated with an operating status of a disabled member of said cluster.

22. A computer readable medium as recited in claim 19, wherein:
said step of determining said operating status for one or more of said data storage servers within said cluster comprises each enabled data storage server designating a set of enabled members in said cluster; and
said step of determining said operating condition comprises detecting an inconsistency among the designated sets of enabled members in said cluster.

23. A computer readable medium as recited in claim 16, wherein said method further comprises:
said standby data storage system determining a time at which said cluster was determined to be operating as multiple clusters, based on information transmitted inband within said log data; and
said standby data storage system ignoring changes to said primary data storage reported in said changes as having occurred after said time at which said cluster was determined to be operating as multiple clusters.

24. A computer readable medium as recited in claim 16, wherein said method further comprises said standby data storage system replacing said primary data storage as a new primary data storage.

25. A computer readable medium as recited in claim 16, wherein said step of determining said operating status in said method comprises a first of said data storage servers designating a second of said data storage servers as a disabled member of said cluster.

26. A computer readable medium as recited in claim 25, wherein said step of determining said operating status in said method comprises encoding a time at which said second of said data storage server is designated as a disabled member of said cluster.

27. A computer readable medium as recited in claim 16, wherein said step of determining said operating status in said method comprises at least two of said data storage servers designating respective sets of said data storage servers as enabled members in said cluster.

28. A computer readable medium as recited in claim 16, wherein said primary data storage comprises a database.

29. A computer readable medium as recited in claim 16, wherein said primary data storage comprises a file system.

30. A computer readable medium as recited in claim 16, wherein said primary data storage comprises a storage array.

\* \* \* \* \*

UNITED STATES PATENT AND TRADEMARK OFFICE
CERTIFICATE OF CORRECTION

| | | |
|---|---|---|
| PATENT NO. | : 8,615,578 B2 | Page 1 of 1 |
| APPLICATION NO. | : 11/245868 | |
| DATED | : December 24, 2013 | |
| INVENTOR(S) | : Hu et al. | |

It is certified that error appears in the above-identified patent and that said Letters Patent is hereby corrected as shown below:

In the Specification

In column 2, line 56, delete "storage-system," and insert -- storage system, --, therefor.

In column 8, line 30-31, delete "(FIG. 1. 101)" and insert -- (FIG. 1, 101) --, therefor.

In the Claims

In column 15, line 47, in Claim 16, delete "to by" and insert -- to --, therefor.

Signed and Sealed this
Twenty-ninth Day of July, 2014

Michelle K. Lee
*Deputy Director of the United States Patent and Trademark Office*